(12) United States Patent
Whittall

(10) Patent No.: US 8,075,071 B1
(45) Date of Patent: Dec. 13, 2011

(54) RESTROOM UTILITY DEVICE

(76) Inventor: Donald E. Whittall, Jacksonville, FL (US)

( * ) Notice: Subject to any disclaimer, the term of this patent is extended or adjusted under 35 U.S.C. 154(b) by 721 days.

(21) Appl. No.: 12/041,977

(22) Filed: Mar. 4, 2008

(51) Int. Cl.
*A47B 83/00* (2006.01)
*A47B 46/00* (2006.01)

(52) U.S. Cl. ............ 312/249.12; 312/237; 312/209; 312/235.1; 312/280

(58) Field of Classification Search ......... 312/249.1, 312/249.8, 249.11, 249.12, 249.13, 209, 312/231, 237, 283, 330.1, 235.1, 280
See application file for complete search history.

(56) References Cited

U.S. PATENT DOCUMENTS

| | | | | |
|---|---|---|---|---|
| 2,503,807 A | * | 4/1950 | Dolas | 312/231 |
| 2,904,381 A | * | 9/1959 | Prince | 312/126 |
| 3,708,709 A | * | 1/1973 | Morrison et al. | 312/209 |
| 4,318,575 A | | 3/1982 | Redlich | |
| 4,893,885 A | | 1/1990 | Borello | |
| 5,564,803 A | * | 10/1996 | McDonald et al. | 312/215 |
| 5,655,905 A | * | 8/1997 | Jaimes et al. | 433/77 |
| 5,720,547 A | * | 2/1998 | Baird | 312/107 |
| 5,975,658 A | * | 11/1999 | Verbeek et al. | 312/209 |
| 6,371,584 B1 | | 4/2002 | Alreck | |
| 6,802,578 B1 | * | 10/2004 | Lang et al. | 312/235.1 |
| 6,976,744 B2 | * | 12/2005 | Hay et al. | 312/281 |
| D514,846 S | | 2/2006 | McDiarmid | |
| 2002/0056794 A1 | | 5/2002 | Ibrahim | |
| 2005/0099102 A1 | * | 5/2005 | Villarreal | 312/237 |
| 2006/0027146 A1 | | 2/2006 | Lee | |
| 2006/0284526 A1 | | 12/2006 | Pathmanathan et al. | |
| 2008/0036343 A1 | * | 2/2008 | Wang | 312/283 |

* cited by examiner

*Primary Examiner* — James O Hansen
(74) *Attorney, Agent, or Firm* — Crossley Patent Law; Mark A. Crossley

(57) ABSTRACT

A restroom utility device that allows an individual, while using a restroom, to work on a computer and perform other related office tasks. The device performs both typical "restroom" functions along with various office functions and has an outer casing. A see-through drawer and a cabinet are accessible through the front of the outer casing, which also has an attached slide-out scale located at floor level and a number of side pocket compartments on the left and right sides of the outer casing. The device is mobile through the use of a quartet of castor wheels and also includes an adjustable reading tray that is attached to a fixed mount extending out of the top of the outer casing. The reading tray includes a pair of slide-out supports that can be extended to the left and right of the reading tray for extra surface area as needed.

6 Claims, 6 Drawing Sheets

RESTROOM UTILITY DEVICE

BACKGROUND OF THE INVENTION

The present invention concerns that of a new and improved restroom utility device that allows an individual, while using a restroom, to work on a computer and perform other related office tasks.

SUMMARY OF THE INVENTION

The present invention concerns that of a new and improved restroom utility device that allows an individual, while using a restroom, to work on a computer and perform other related office tasks. The device performs both typical "restroom" functions along with various office functions and has an outer casing. A see-through drawer and a cabinet are accessible through the front of the outer casing, which also has an attached slide-out scale located at floor level and a number of side pocket compartments on the left and right sides of the outer casing. The device is mobile through the use of a quartet of castor wheels and also includes an adjustable reading tray that is attached to a fixed mount extending out of the top of the outer casing. The reading tray includes a pair of slide-out supports that can be extended to the left and right of the reading tray for extra surface area as needed.

There has thus been outlined, rather broadly, the more important features of a restroom utility device that the detailed description thereof that follows may be better understood and in order that the present contribution to the art may be better appreciated. There are, of course, additional features of the restroom utility device that will be described hereinafter and which will form the subject matter of the claims appended hereto.

In this respect, before explaining at least one embodiment of the restroom utility device in detail, it is to be understood that the restroom utility device is not limited in its application to the details of construction and to the arrangements of the components set forth in the following description or illustrated in the drawings. The restroom utility device is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present restroom utility device. It is important, therefore, that the claims be regarded as including such equivalent constructions insofar as they do not depart from the spirit and scope of the present invention.

It is therefore an object of the present invention to provide a restroom utility device which has all of the advantages of the prior art and none of the disadvantages.

It is another object of the present invention to provide a restroom utility device which may be easily and efficiently manufactured and marketed.

It is another object of the present invention to provide a restroom utility device which is of durable and reliable construction.

It is yet another object of the present invention to provide a restroom utility device which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
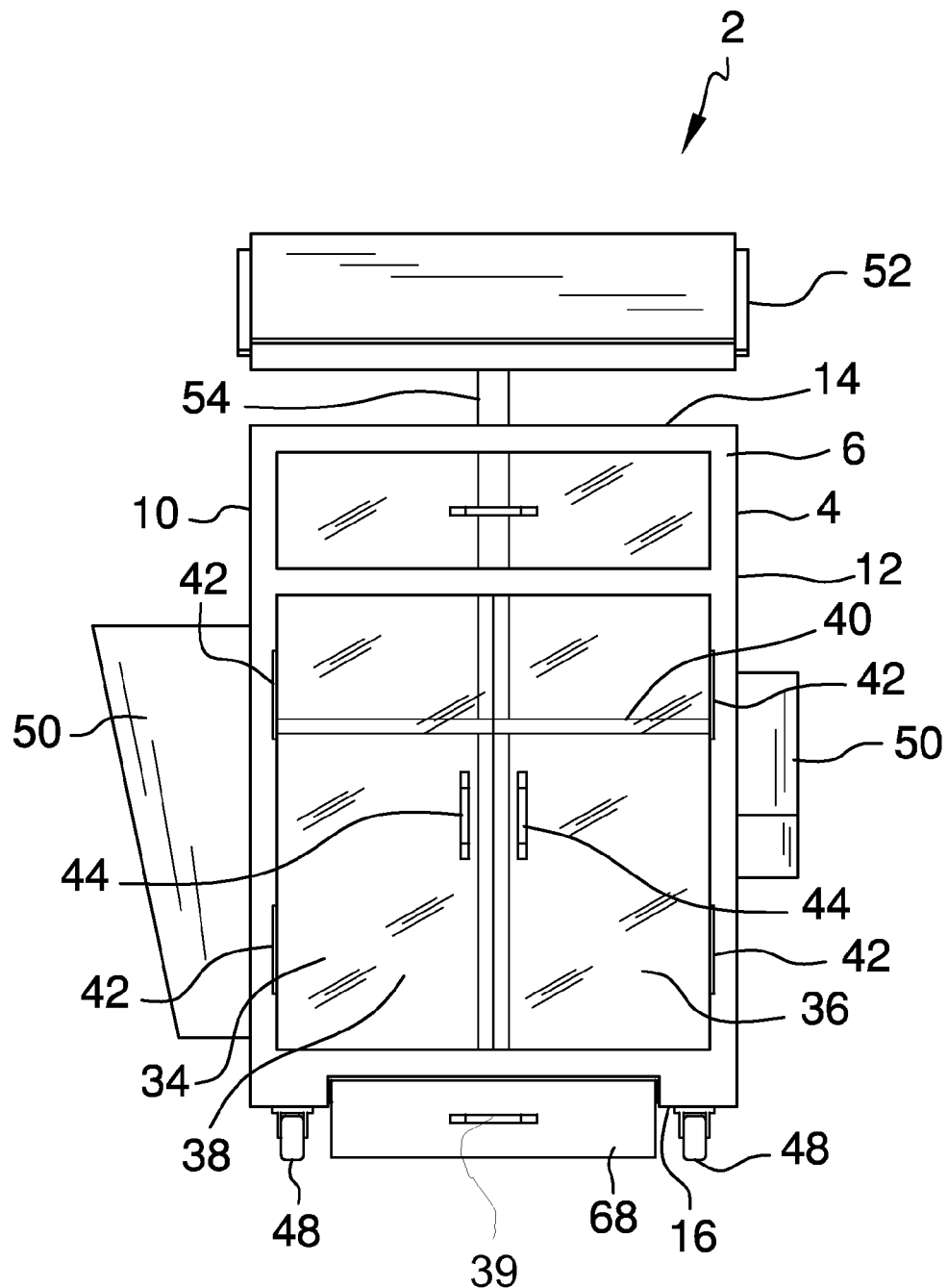
FIG. 1 shows a front view of the restroom utility device.
Figure 2:
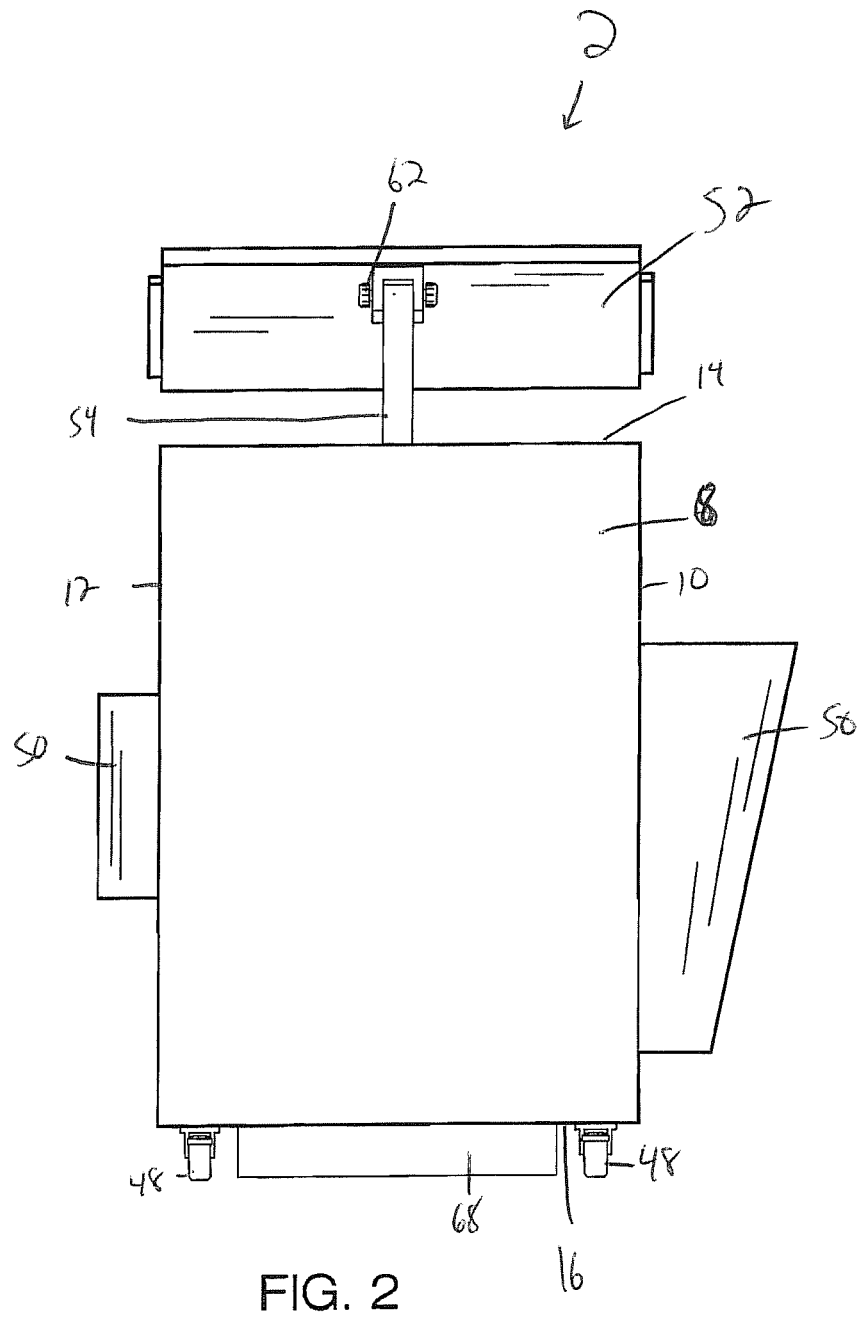
FIG. 2 shows a rear view of the restroom utility device.
Figure 3:
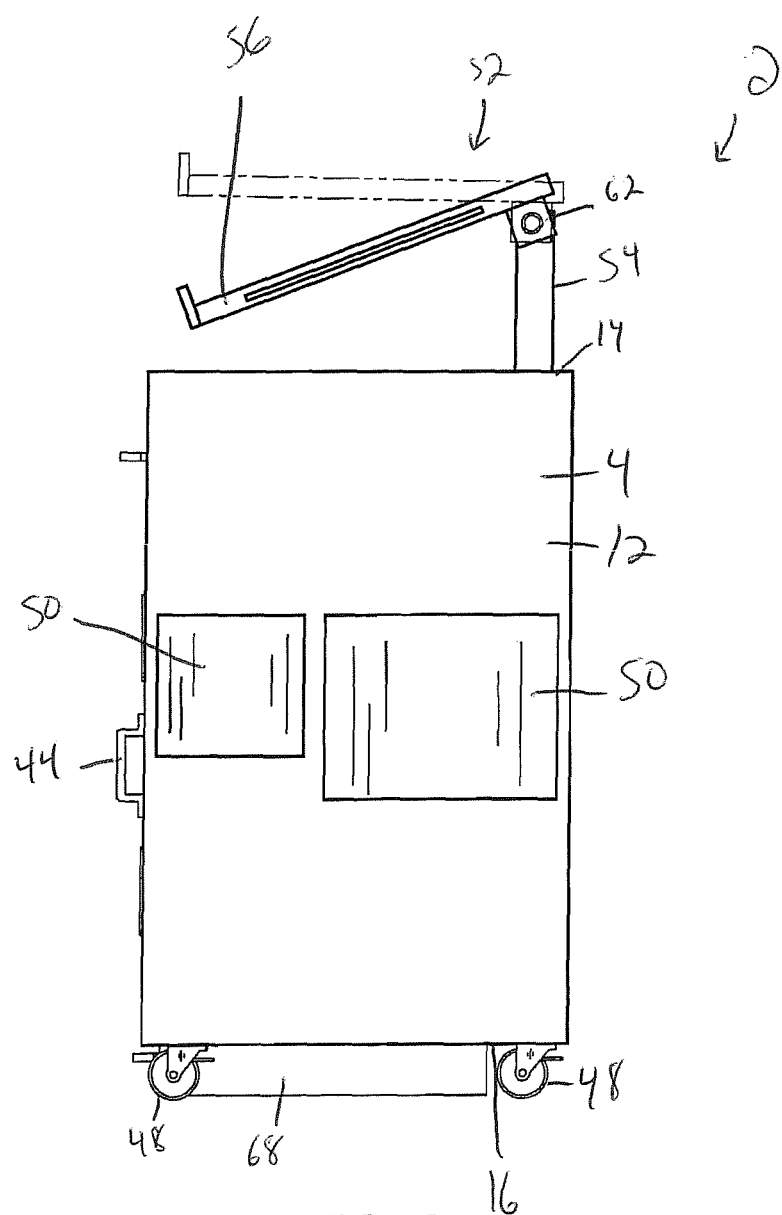
FIG. 3 shows a left side view of the restroom utility device.
Figure 4:
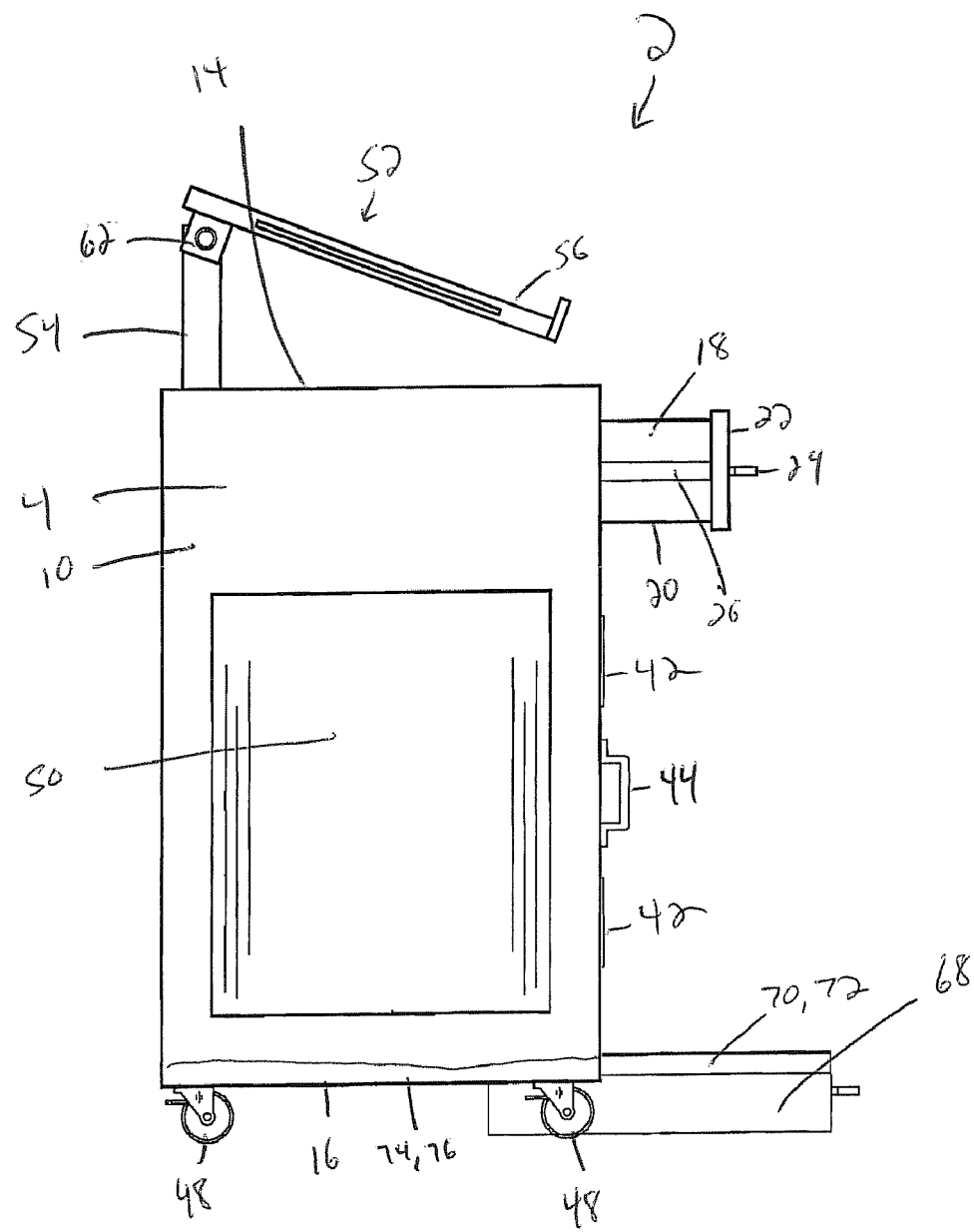
FIG. 4 shows a right side view of the restroom utility device.
Figure 5:
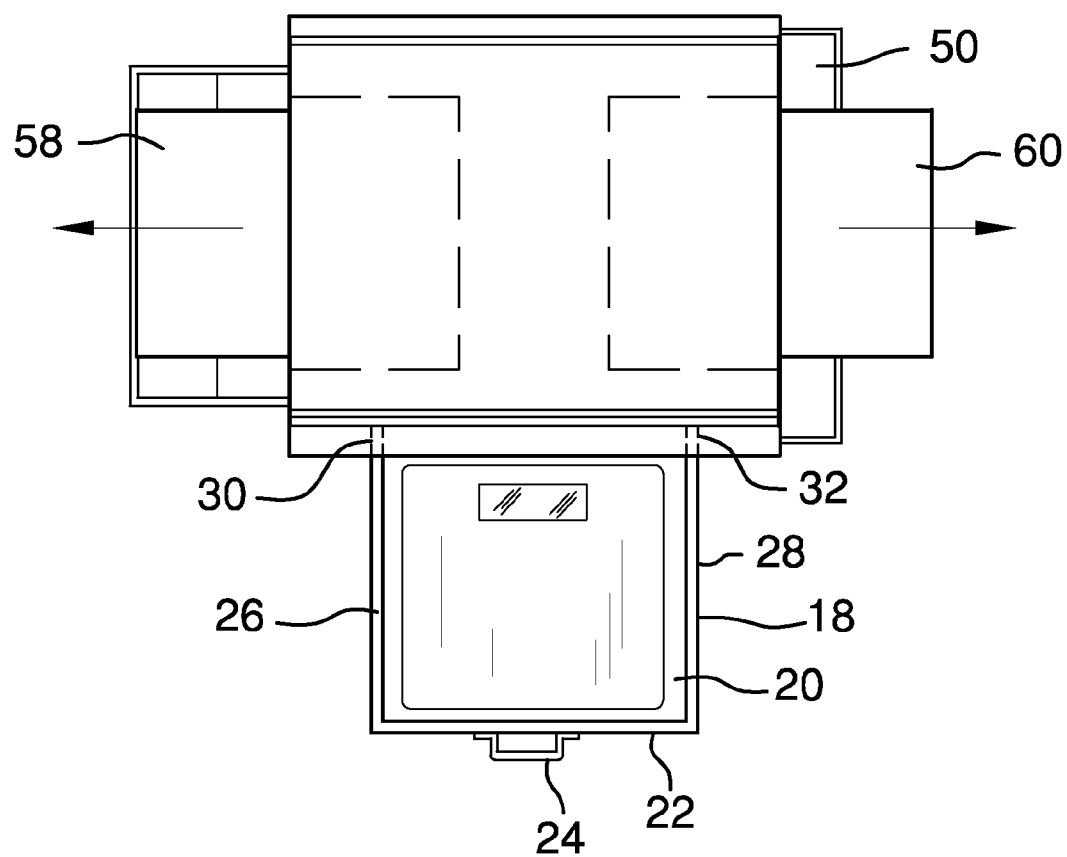
FIG. 5 shows a top view of the restroom utility device.
Figure 6:
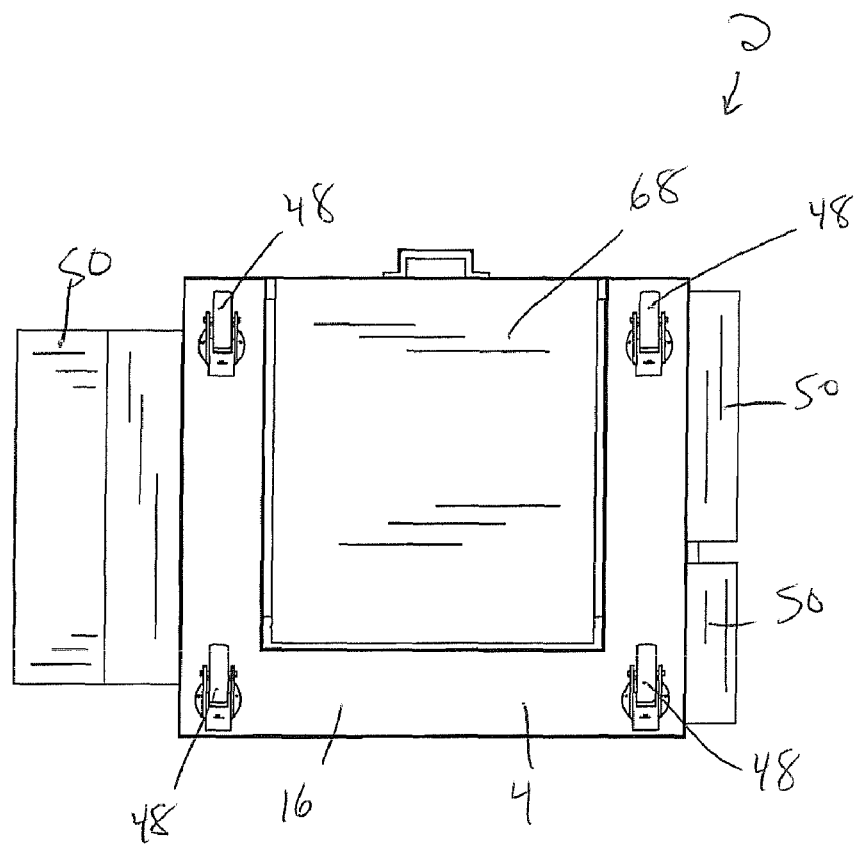
FIG. 6 shows a bottom view of the restroom utility device.

With reference now to the drawings, and in particular to FIGS. 1 through 6 thereof, a restroom utility device embodying the principles and concepts of the present invention and generally designated by the reference numeral 2 will be described.

As best illustrated in FIGS. 1 through 6, the restroom utility device 2 comprises an outer casing 4 that is essentially shaped like a box-like file cabinet. The outer casing 4 has several surfaces including a front surface 6, a rear surface 8, a left side surface 10, and a right side surface 12. The front surface 6 is attached to the left side surface 10 and the right side surface 12, which are both attached to the rear surface 8. The outer casing 4 also includes a top surface 14 and a bottom surface 16 which are both attached to the front surface 6.

A drawer 18 is located within the outer casing 4, with the drawer 18 including a base 20, a front portion 22, and a handle 24 attached to the front portion 22 of the drawer 18. The front portion 22 is preferably manufactured from a transparent material to allow an individual to see the contents within the drawer 18 even when the drawer 18 is closed. The drawer 18 itself is track-mounted within the outer casing 4 through the presence of a pair of inserts 26 and 28 attached to the drawer, with these inserts being inserted into a pair of tracks 30 and 32 that are mounted within the outer casing 4.

Most of the surface area of the front surface 6 of the outer casing 4 is occupied by a pair of cabinet doors 34 and 36 which cover a cabinet 38 located within the outer casing 4. Preferably, the cabinet 38 also includes at least one shelf 40. Each of the cabinet doors 34 and 36 are pivotally mounted to the outer casing 4 through a plurality of hinges 42, with each of the cabinet doors 34 and 36 including a handle 44 for easy opening and closure of the respective cabinet door 34 and 36.

A scale 68 is mounted to the bottom surface 16 of the outer casing 4, with the scale 68 itself being track-mounted to the bottom surface 16 of the outer casing 4 through the presence of a pair of inserts 70 and 72 attached to the scale 68, with these inserts being inserted into a pair of tracks 74 and 76 that are mounted to the bottom surface 16 of the outer casing 4. The scale 68 has a handle 39, allowing an individual to easily grasp the scale 68 and pull the scale out away from the outer casing 4 so it can be used.

The device 2 also includes a quartet of castor wheels 48 that are attached to the bottom surface 16 of the outer casing 4. One or more of the castor wheels 48 is designed to be a lockable-type castor wheel, allowing an individual to give or remove the attribute of mobility from each castor wheel 48 as needed.

A plurality of side pocket compartments 50 are attached to the left side surface 10 and the right side surface 12 of the outer casing 4. Each side pocket compartment has a fixed configuration and is designed to allow an individual to store magazines, books, or other related materials as needed.

The device 2 further comprises an adjustable reading tray 52 that includes a fixed stand 54 attached to the top surface 14 of the outer casing 4, a platform 56 pivotally attached to the fixed stand 54, and a pair of side supports that can be extended out of the stand 54, said supports comprising a left side support 58 and a right side support 60. An adjustable tightening knob 62 is present to tighten or loosen the connection between the fixed stand 54 and the platform 56 so an individual can "set" the position of the platform 56 relative to the fixed stand 54 once an ideal position is reached while an individual is working on the device 2.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A restroom utility device comprising
    an outer casing, the outer casing having two surfaces comprising a front surface, the outer casing further comprising a left side surface attached to the front surface, the outer casing further comprising a right side surface attached to the front surface, the outer casing further comprising a top surface attached to the front surface, the outer casing further comprising a bottom surface attached to the front surface, the outer casing further comprising a rear surface attached to the left side surface and to the right side surface,
    a drawer located within the outer casing,
    means for attaching the drawer to the outer casing,
    a pair of cabinet doors comprising a first cabinet door and a second cabinet door, the pair of cabinet doors covering a cabinet within the outer casing,
wherein each cabinet door includes a handle,
    means for attaching each of the cabinet doors to the outer casing,
    means for providing mobility to the restroom utility device,
    wherein the device further comprises
        at least one shelf,
        wherein the shelf is located within the outer casing,
    wherein the device further comprises
        a scale,
        means for attaching the scale to the bottom surface of the outer casing,
        means for grasping the scale,
    wherein the means for attaching the scale to the bottom surface of the outer casing further comprises
        a pair of tracks comprising a first track and a second track, wherein each of the tracks of the pair of tracks are mounted to the bottom surface of the outer casing,
        a pair of inserts comprising a first insert and a second insert, wherein the pair of inserts are attached to the scale,
        further wherein the first insert is inserted into the first track of the pair of tracks,
        further wherein the second insert is inserted into the second track of the pair of tracks,
    wherein the means for grasping the scale further comprises
        a handle,
        wherein the handle is attached to the scale,
    wherein the means for attaching each of the cabinet doors to the outer casing further comprises
        a plurality of hinges,
        wherein each of the cabinet doors of the pair of cabinet doors are pivotally attached to the outer casing,
    wherein the means for providing mobility to the restroom utility device further comprises
        a plurality of castor wheels,
        wherein each of castor wheel of the plurality of castor wheels is attached to the bottom surface of the outer casing,
    wherein the plurality of castor wheels numbers four castor wheels;
    wherein at least one of the castor wheels of the plurality of castor wheels comprises a lockable-type castor wheel;
    wherein the drawer further comprises
        a base,
        a front portion attached to the base,
        a handle attached to the front portion,
        wherein the front portion attached to the base is manufactured from a transparent material.

2. A restroom utility device according to claim 1 wherein the means for attaching the drawer to the outer casing further comprises
    (a) a pair of inserts comprising a first insert and a second insert, wherein each of the inserts of the pair of inserts are attached to the drawer,
    (b) a pair of tracks comprising a first track and a second track, wherein each track of the pair of tracks are mounted within the outer casing,
    (c) wherein the first insert of the pair of inserts is inserted into the first track of the pair of tracks, and
    (d) further wherein the second insert of the pair of inserts is inserted into the second track of the pair of tracks.

3. A restroom utility device according to claim 2 wherein the device further comprises
    (a) a plurality of side pocket compartments,
    (b) wherein the side pocket compartments are attached to the left side surface and the right side surface of the outer casing,
    (c) further wherein each side pocket compartment has a fixed configuration.

4. A restroom utility device according to claim 3 wherein the device further comprises an adjustable reading tray, wherein the adjustable reading tray further comprises
    (a) a fixed stand attached to the top surface of the outer casing,
    (b) a platform pivotally attached to the fixed stand,
    (c) a pair of side supports comprising a left side support and a right side support, wherein each of the side supports can be independently extended out of the platform, and
    (d) means for adjusting the connection between the fixed stand and the platform.

5. A restroom utility device according to claim 4 wherein the means for adjusting the connection between the fixed stand and the platform further comprises
    (a) an adjustable tightening knob attached to the fixed stand, the adjustable tightening knob also attached to the platform, (b) wherein an individual can tighten or loosen the knob to tighten or loosen the connection between the fixed stand and the platform to set the position of the platform in relation to the fixed stand.

6. A restroom utility device comprising
(a) an outer casing, the outer casing having two surfaces comprising a front surface, the outer casing further comprising a left side surface attached to the front surface, the outer casing further comprising a right side surface attached to the front surface, the outer casing further comprising a top surface attached to the front surface, the outer casing further comprising a bottom surface attached to the front surface, the outer casing further comprising a rear surface attached to the left side surface and to the right side surface,
(b) a drawer located within the outer casing, wherein the drawer further comprises (i) a base, (ii) a front portion attached to the base, (iii) a handle attached to the front portion, (iv) wherein the front portion attached to the base is manufactured from a transparent material,
(c) means for attaching the drawer to the outer casing, said means further comprising (i) a pair of inserts comprising a first insert and a second insert, wherein each of the inserts of the pair of inserts are attached to the drawer, (ii) a pair of tracks comprising a first track and a second track, wherein each track of the pair of tracks are mounted within the outer casing, (iii) wherein the first insert of the pair of inserts is inserted into the first track of the pair of tracks, and (iv) further wherein the second insert of the pair of inserts is inserted into the second track of the pair of tracks,
(d) a pair of cabinet doors comprising a first cabinet door and a second cabinet door, the pair of cabinet doors covering a cabinet within the outer casing, wherein each cabinet door includes a handle,
(e) means for attaching each of the cabinet doors to the outer casing, said means further comprising (i) a plurality of hinges, (ii) wherein each of the cabinet doors of the pair of cabinet doors are pivotally attached to the outer casing,
(f) means for providing mobility to the restroom utility device, said means further comprising (i) a plurality of castor wheels, said plurality numbering four castor wheels, (ii) wherein each of castor wheel of the plurality of castor wheels is attached to the bottom surface of the outer casing, further wherein at least one of the castor wheels of the plurality of castor wheels comprises a lockable-type castor wheel,
(g) at least one shelf, wherein the shelf is located within the outer casing,
(h) a scale,
(i) means for attaching the scale to the bottom surface of the outer casing, said means further comprising (i) a pair of tracks comprising a first track and a second track, wherein each of the tracks of the pair of tracks are mounted to the bottom surface of the outer casing, (ii) a pair of inserts comprising a first insert and a second insert, wherein the pair of inserts are attached to the scale, (iii) further wherein the first insert is inserted into the first track of the pair of tracks, and (iv) further wherein the second insert is inserted into the second track of the pair of tracks,
(j) means for grasping the scale, said means further comprising (i) a handle, (ii) wherein the handle is attached to the scale,
(k) a plurality of side pocket compartments, wherein the side pocket compartments are attached to the left side surface and the right side surface of the outer casing, further wherein each side pocket compartment has a fixed configuration,
(l) an adjustable reading tray, wherein the adjustable reading tray further comprises (i) a fixed stand attached to the top surface of the outer casing, (ii) a platform pivotally attached to the fixed stand, (iii) a pair of side supports comprising a left side support and a right side support, wherein each of the side supports can be independently extended out of the platform, and (iv) means for adjusting the connection between the fixed stand and the platform, said means further comprising (1) an adjustable tightening knob attached to the fixed stand, the adjustable tightening knob also attached to the platform, (2) wherein an individual can tighten or loosen the knob to tighten or loosen the connection between the fixed stand and the platform to set the position of the platform in relation to the fixed stand.

\* \* \* \* \*